June 11, 1935. R. INNES 2,004,870
BLOTTING ATTACHMENT FOR PENS
Filed Sept. 11, 1934 4 Sheets-Sheet 1

INVENTOR
ROBERT INNES.

BY Eugene E. Stevens
ATTY.

June 11, 1935.   R. INNES   2,004,870
BLOTTING ATTACHMENT FOR PENS
Filed Sept. 11, 1934    4 Sheets-Sheet 2
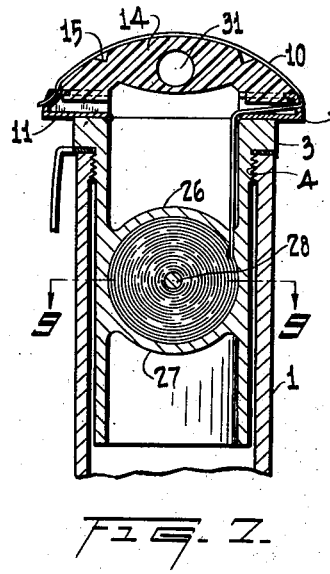
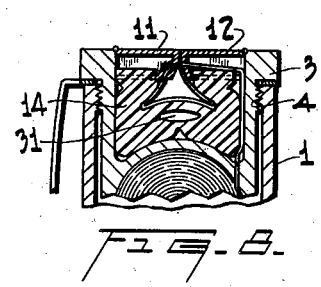
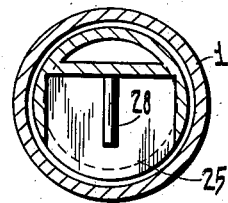
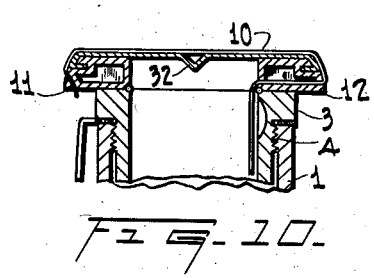
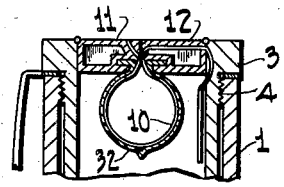
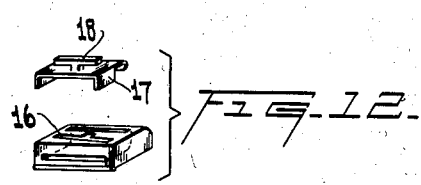
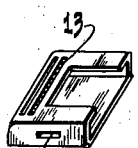
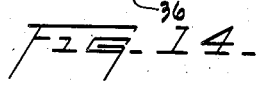
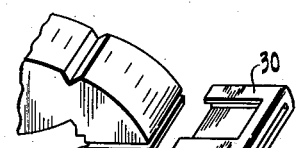
INVENTOR.
ROBERT INNES.
BY Eugene E. Stevens
ATTY.

June 11, 1935.  R. INNES  2,004,870

BLOTTING ATTACHMENT FOR PENS

Filed Sept. 11, 1934  4 Sheets—Sheet 3

INVENTOR
ROBERT INNES.
By Eugene E. Stevens
ATTY.

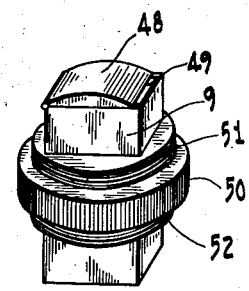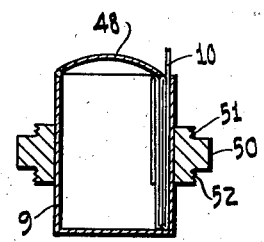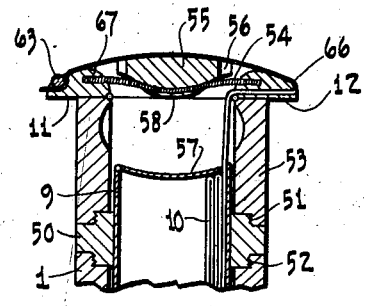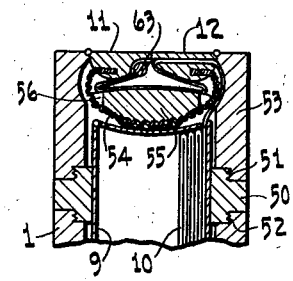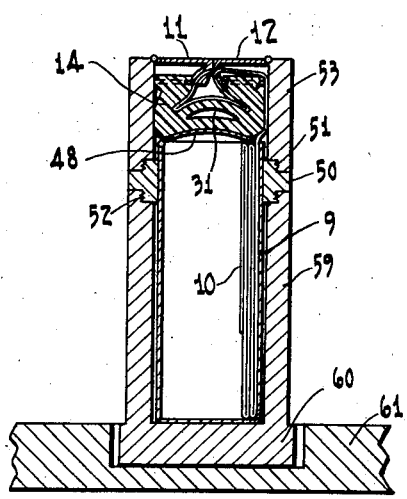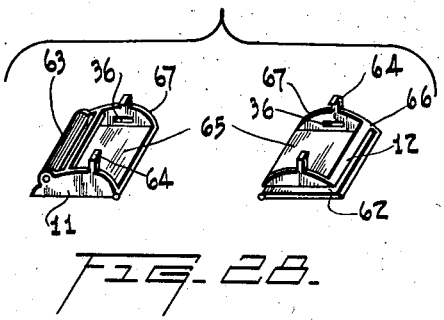

Patented June 11, 1935

2,004,870

UNITED STATES PATENT OFFICE 2,004,870

BLOTTING ATTACHMENT FOR PENS

Robert Innes, Coldbrook, Nova Scotia, Canada

Application September 11, 1934, Serial No. 743,582

20 Claims. (Cl. 120—24)

This invention relates particularly to a blotting attachment for pens although it is also applicable to blotting devices generally and an object of the invention is to provide an attachment which is relatively simple, compact and capable of presenting a usefully large, well supported and well cushioned surface of blotting medium.

According to the invention, the attachment comprises a container adapted to contain a blotting strip and means for projecting a portion of said strip from the container that may take the form of a foldable bridge member which, in unfolded position, has a length substantially greater than any cross sectional length of the attachment. The invention also includes means for permitting movement of the strip only out of the container and a closure member for holding the movable parts or the bridge member in folded position when the device is not in use. The blotting strip is adapted to pass out of the container and over the bridge member in unfolded position, being supported thereby for blotting purposes, the means for permitting movement of the strip only out of the container being situated at the other end of the bridge from that to which the strip first comes from the container.

The invention will be more fully understood by reference to the attached drawings in which:

Figure 7 is a longitudinal section of another form of attachment in open position.

Figure 8 is a longitudinal section of the form shown in Figure 7 in closed position.

Figure 9 is a cross sectional view taken along the line 9—9 of Figure 7.

Figure 10 is a longitudinal section of a further form of attachment in open position.

Figure 11 is a longitudinal elevation of the form shown in Figure 10 in closed position.

Figure 12 is a perspective view of one means for attaching the bridge member to the closure member, when the latter is in the form of a door.

Figure 13 is a perspective view of means, alternative to those of Figure 12, for attaching the bridge member to a door.

Figure 14 is a view of a form of door, embodying means for permitting the blotting strip to move only out of the container.

Figure 23 is a perspective view of an alternative form of holder for the blotting paper including a connecting member for mounting the holder in the end of a pen or other receiving member.

Figure 24 is a longitudinal sectional elevation of the structure shown in Figure 23.

Figure 25 illustrates in sectional elevation an alternative form of bridge member and resilient means for an attachment of this character, also illustrating the use of a holder similar to the type illustrated in Figures 23 and 24 but employing a concave top instead of a convex top.

Figure 26 is a sectional elevation of the device shown in Figure 25 but in folded position.

Figure 27 is a sectional elevation of one form of the invention as applied to a desk set instead of a pen, the form of blotter holder and associated parts being of the type illustrated in Figures 23 and 24.

Figure 28 is a detail perspective of an alternative construction of doors for the attachment, illustrating a different type of slot or passageway for the blotter, a rotary member for holding and ejecting the blotting paper and a different form of securing means for the rubber bridge member.

Figures 1, 2:
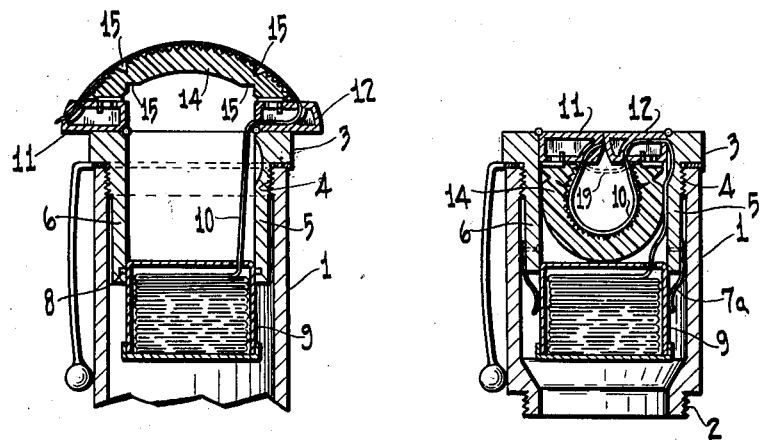
Figure 1 is a longitudinal section through one form of attachment in open or operative condition.
Figure 2 is a sectional elevation of the same form in closed or inoperative position and shows how the attachment may be applied bodily to pens originally made without it.
Figure 3:
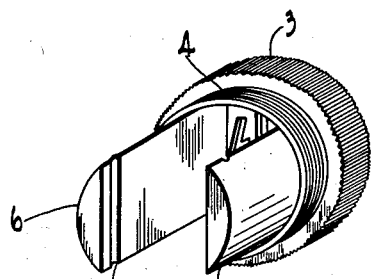
Figure 3 is a perspective view of the attachment removed from a pen and without the blotting container.

In the form of attachment shown in Figures 1, 2 and 3 of the drawings, 1 indicates the uppermost end of a pen cap or of an extension attached to it by a screw threaded portion 2, in Figure 2. The attachment is preferably connected to the pen cap after the manner of the inner tubular portion in the caps of pens such as the Parker Duofold, that is its uppermost portion 3, of the same diameter as the pen cap, is milled and a portion 4 of reduced diameter immediately below it is screw threaded and engages with corresponding screw threads on the interior of the pen cap at the top thereof. From the screw threaded portion of the attachment extend two legs 5 and 6 which have, at their lower ends, horizontal grooves 7 into which fit projections 8 on a holder 9 adapted to contain a blotting strip 10. The holder or magazine 9 is the container proper for the blotting strip although that portion of the cap or attachment designated by the numeral 1 in Figure 2 or its equivalent is the container for the apparatus as a whole and, therefore, may be referred to generally as a container. Likewise the member 3 and holder coupled therewith and equivalent structure in other illustrations may be similarly designated.

Figure 16:
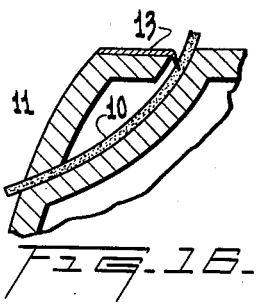
Figure 16 is a detail sectional view showing alternative means for permitting the blotting strip to move only out of the container.

The closure member for the attachment in the present form consists of two doors 11 and 12 opening outwardly as shown in Figure 1. These doors have passages therein for the blotting strip and on the door 11 is provided means for permitting the blotting strip to move only out of the container. These means as shown in Figures 14 or 16 are in the form of a preferably saw edged member 13 extending into the passage in the path of the blotting strip in such a manner that, if an attempt were made to pull the strip upwardly in Figures 14 or 16, the member 13 would bite into it. On the other hand, the roller structure 13a in Figures 25 and 28 to be described later on performs the same function.

Connected to the two doors is a foldable resilient bridge member 14, preferably made of rubber with, if desired, a fabric centre or backbone for added strength. Notches 15 are cut in the member 14 on both sides to facilitate its folding when the doors are closed. The bridge member may be connected to the doors in any suitable manner, that shown in Figure 1 being illustrated in detail in Figure 12 where each door is formed in the side which is uppermost when the door is open with a T-shaped slot 16, the bar of the T being preferably at an angle to the leg. A base member 17 is fixed to each end of the bridge, this base member being formed with a T-shaped projection 18 cooperating with the T-shaped slot in the door to connect the bridge member.

When the attachment is to be made ready for use, a container with a blotting strip is attached and the strip fed out through the passage in the door 12. The bridge member is then connected and the strip is fed over this latter and out through the passage in the door 11. The doors are then closed so that the device assumes the position shown in Figure 2, where an alternative form of attachment for the container by means of spring clips 7a is shown, and are held closed by means such as those shown in Figures 15 or 17. In this position the attachment is screwed into the pen cap and is ready for use. Upon release of the means for holding the doors closed the latter open under the pressure of the resilient foldable bridge member, which, as shown in Figure 2, is held in folded compressed position when the doors are closed. The bridge member, therefore, apart from providing a base for the strip when used, constitutes resilient means for projecting a portion of the blotting strip beyond the container or attachment. To close the attachment it is only necessary to swing the doors inwardly and the bridge member, by reason of the notches 15 will fold downwardly in a natural manner.

A new surface of the blotting strip may be presented whenever the attachment is open by simply pulling the end of the strip projecting from the door 11 and tearing it off along the upper side of the passage which is made sharp for this purpose. When a new surface is desired for the next time the device is opened, the doors may be partially closed and the end of the blotting strip then pulled out and torn off so that the strip is in the position shown by dotted lines 19 in Figure 2. When the doors are opened the next time a fresh part of the strip automatically comes into position.

Figure 4:
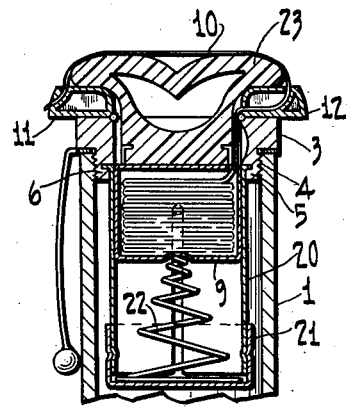
Figure 4 is a longitudinal section of a modified form of attachment in open or operative position.
Figure 5:
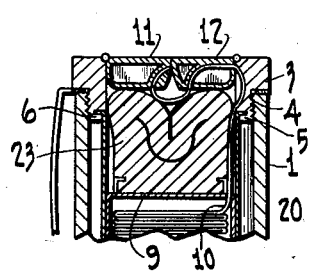
Figure 5 is a longitudinal section of the form shown in Figure 4 but in closed position.

The form of attachment shown in Figure 4 differs in certain respects from that shown in the preceding figures. In this form the legs 5 and 6 are much shortened and to them is attached an open ended member 20 having a removable closure 21 at the bottom thereof. The holder or magazine 9 for the blotting strip is movable in the member and is urged upwardly by a spring 22. To the top of the holder or magazine 9 is attached a resilient bridge member 23 of a different form from that shown in Figure 1 but being like the latter so formed that in unfolded position it has a length substantially greater than any cross sectional length of the attachment.

Figure 6:
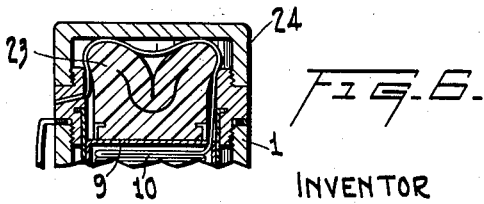
Figure 6 is a longitudinal section of a form similar to that shown in Figure 4 but with a different type of closure member.

In Figure 6 the attachment is of the same form as in Figure 4 but instead of a door a screw threaded cap 24 is used as a closure for the device.

The form of attachment of Figures 7 and 8 has the advantage of being unitary in that the blotter holder is formed as one with the rest of the attachment. In this form, the part of the attachment below the screw threaded portion is exteriorly cylindrical but one side is cut away as indicated at 25 in Figure 9.

Upwardly and downwardly convexed cross pieces 26 and 27 respectively are provided and between these the attachment is interiorly rectangular in cross section for the reception of a roll of, instead of a folded blotting strip which is supported on a spindle 28. The method of connecting the resilient bridge member to the doors shown in this figure and illustrated more in detail in Figure 13 is somewhat different from that previously described. According to it the ends of the bridge member are provided with grooves 29 and the sides of the doors which are uppermost when the doors are open are cut away to leave tongues 30 which fit into the grooves 29. The bridge member shown in Figure 7 is of heavier construction than that shown in Figure 1 and has a circular hole 31 in it to enable it to fold properly.

The form of attachment illustrated in Figure 10 differs from the other forms only in so far as the bridge member is concerned, the latter being in this case of thin spring metal, covered with rubber if desired. The bridge is notched at the centre at 32 in order to ensure that it should fold downwardly, and is connected to the ends of the doors which are outermost when they are open.

Figure 15:
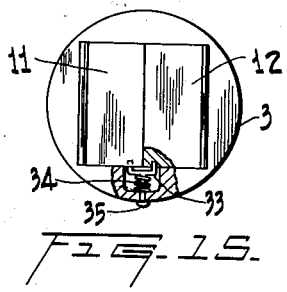
Figure 15 is a partly sectional view of a simple form of means for holding two doors closed but which does not permit one door to be held closed while the other is being closed.

In Figure 15 is illustrated the simplest form of means for holding the doors of the attachment closed when the latter is not in use. As illustrated, these comprise simply a fork 33 pressed inwards by a spring 34 and having an exterior knob 35 by means of which it may be pulled out. The ends of the fork enter openings 36 in the doors illustrated in Figures 13 and 14.

Figure 17:
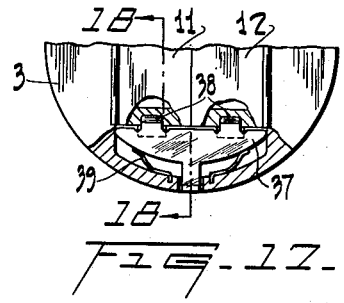
Figure 17 is a view partly in section showing means whereby, when two doors are used to close the attachment, one door may be held closed while the other remains open.
Figure 18:
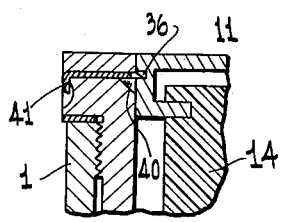
Figure 18 is a sectional view taken along the line 18—18 in Figure 17.
Figure 19:
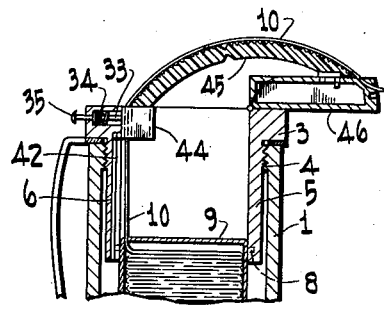
Figure 19 is a longitudinal section of a form of attachment, in which only one door is used as a closure member, in open position.

Figures 17 and 18 show a form of means which permit one door to be pressed shut and then the other without the holding means, thereby releasing the first. These means comprise a member 37 having resilient tongues 38 adapted to enter the openings 36 in the doors, the member being pressed inwardly by leaf springs 39. Below the tongues the attachment is cut away as at 40 to permit the tongues to be pressed down by the lower edges of the doors as the latter close. When the tongues are pressed down they bear against the sides of the doors until they enter the openings 36, the leaf springs 39 being strong enough to prevent the member 37 as a whole from being pressed outward. To release the doors the member 37 is pulled outward by means of the downturned portion 41.

Figure 20:
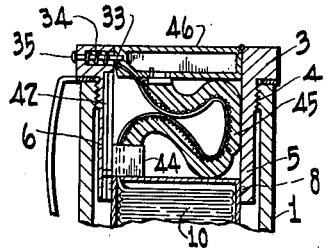
Figure 20 is a longitudinal section of the form shown in Figure 19 in closed position.
Figure 21:
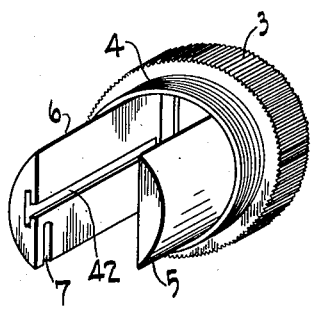
Figure 21 is a perspective view of the attachment of Figure 19 removed from the pen and without the blotting container.
Figure 22:
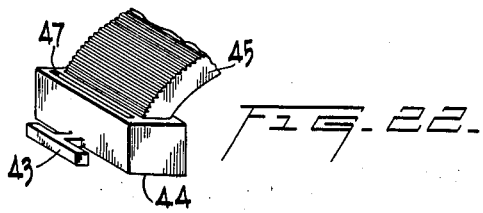
Figure 22 is a detail perspective view of a slider to which one end of the bridge member in the form shown in Figure 19 is attached.

Figures 19–22 show a modified form of attachment in which one door, instead of two, is used. In this form the leg 6 is formed not only with a groove 7 but also with a longitudinally extending T-shaped groove 42 in which can run a complementarily shaped projection 43 on a slider 44. The resilient bridge member 45 has one end attached to the slider and the other end to the door 46. As the door is closed a downward pressure is excited on the slider which thus moves toward the position in which it is shown in Figure 20 and which it occupies when the door is fully closed. When the door is again opened it is pulled upwardly to the position of Figure 19 by the bridge member. The blotting strip passes upwardly toward the bridge member through a passage 47 formed in the slider 44.

In Figures 23 to 27 I have illustrated further alternative forms of construction which for various reasons may be considered as a preferred type of construction.

On referring to Figures 23 and 24, the blotter holder 9 takes the form of a casing preferably square in cross section closed at its lower end and provided with a convex hinged cover 48 which does not cover the area of the top, leaving a space 49 through which the blotting strip may be fed. This holder is rigidly mounted within a collar 50 which is of diameter corresponding to the diameter of the pen or other mounting in which it fits, the outer surface of the collar being ridged or knurled as illustrated. This collar is reduced in its upper and lower extremities to provide the screw threaded nipples 51 and 52, the threads of the nipple 51 being preferably of a different size to those of the nipple 52 so that it cannot be wrongly inserted in its mounting. The screw threaded nipple 52 is designed to fit into the upper end of a pen cap 1, as illustrated in Figure 25, and an extension or the like 53 carrying the doors 12 is designed to be screwed onto the threaded nipple 51. Thus a very simple form of construction is provided which may be removed entirely from the end of the pen cap by turning the collar 50 to unscrew threaded nipple 52 from its cooperating thread in the pen cap while, likewise, the extension 53 can be removed without it being necessary to remove the collar and holder from the pen cap.

Figures 25 and 26, apart from illustrating the manner in which the type of holder illustrated in Figures 23 and 24 is mounted, illustrate a modified form of door construction, bridge member and associated resilient means for opening the doors when released. They also illustrate a slightly different form of cover for the holder 9 to cooperate with the modified form of bridge structure.

According to this alternative construction, the doors 11 and 12 have a coil spring 54 extending between them functioning to exert a pressure against the doors tending to open them so that, when they are released, they will open automatically to the position shown in Figure 25. The ends of the coil spring 54 are suitably mounted within the doors 11 and 12 and also mounted on the coil spring and extending between the doors is a bridge member 55 of the floating type which is notched at its ends as at 56 so that, when the doors are closed as illustrated in Figure 26, the coil spring will fit within the notches 56 and the structure will compactly fit together. The bridge 55 will provide a surface upon which the strip of blotting paper may rest when the doors 11 and 12 are open and, coupled with the coil spring 54, provide a yielding surface similar to a rubber bridge member for the blotting operation.

With this type of construction the cover of the blotter holder is changed to a slightly concaved member 57, as illustrated in Figure 25, while the inner walls of the extension 53 are also slightly concaved as indicated at 58 to provide for the housing of the coil spring when the blotter construction is in folded position.

On viewing Figure 26 it will be noted that the coil spring is housed very neatly and in such a manner that no undue strain is placed upon it so that this type of construction would be very durable.

In Figure 27 the invention is shown as applied to pen sets wherein a tubular housing 59 is provided instead of the end 1 of a pen cap, the housing 59 being provided with a suitable base 60 which may rest in a suitable recess formed in a pen holder base 61. In this illustration the blotter holder and the other construction are similar to that shown in Figures 23 and 25 with the exception that a rubber bridge member 14 of the type illustrated in Figure 8 has been shown and the cover 48 of the blotter holder is convex as in Figure 23, to illustrate the utility of such a cover which functions to press against the rubber bridge when in its folded position, thus providing for a more instantaneous and positive opening of the doors when they are released since the convex cover tends to urge the rubber bridge member upwardly.

In the illustrations covered by Figures 23 to 27 the blotting strip is shown in vertically disposed folds, the portion in use passing through the space 49 at the top of the blotter holder and being slotted through the doors 11 and 12 in a somewhat similar manner to that previously described in connection with other forms of the invention. However, an alternative form of slotting the blotting strip through the doors is illustrated in Figure 28 wherein the door 12 is provided with a slot 62 which is cut right into the door from one side practically over to the other side which provides for inserting the blotter within the door 12 from the side in a very simple operation without the necessity of threading it through.

On the door 11 I have provided a small roller 63 suitably mounted, under which the blotting strip may be threaded as generally illustrated in Figure 25, and the roller 63 may be roughened or ridged so that it will hold the blotting strip in a somewhat similar manner to the toothed member 13 illustrated in Figure 18 while, on the other hand, by rotating the roller in a clockwise direction it may function as an ejector to pull out the used portion of blotting paper but primarily will assist in the slotting of the paper since, on engaging the strip with the roll and rotating the roll, the blotting paper is immediately placed in position in door 11. Also illustrated in Figure 28 is an alternative method of securing the rubber bridge member by providing upstanding lugs 64 which may be pressed into the sides of the rubber bridge member to hold it when it is mounted within the housing portion 65 of the doors 11 and 12.

A further feature which will be noted on referring to Figures 25, 26 and 28 is that the doors are rounded on their outer edges as at 66 and on their inner edges as at 67 so that the blotting strip, when slotted in the doors in the manner illustrated in Figure 25, will follow the natural rounded contour which will permit the blotting paper to move more readily when pulled and, when the doors are folded, the rounded edges provide for plenty of room and obviate any possibility of a tight fit which might bring about jamming of the doors. This type of door construction is preferable for these reasons and it will be understood that it may readily be incorporated in place of the other type of construction illustrated in other figures if desired.

It is to be understood that the various modifications described are only illustrative of many possible ones and that various alternative forms of parts of the attachment may be used with alternative forms of other parts not actually shown in the drawings with them. Thus, for example, the form of connection of the bridge member to the doors in Figures 7 and 13 may be used with the form of attachment shown in Figure 1 and the form of connection in Figures 1 and 12 may be used with the attachment of Figure 7. It is obvious that further interchanging of parts as between the illustrations made is possible. The invention is, therefore, to be limited only by the terms of the appended claims.

I claim:—

1. A blotting attachment for pens comprising a container adapted to house a blotting strip, a releasable closure member for the container and resilient means for projecting a portion of said blotting strip beyond said container when said closure member has been released.

2. A blotting attachment for pens comprising a container adapted to house a blotting strip, a releasable closure member for the container and resilient means for projecting a portion of said blotting strip of a size greater than the cross sectional width of the container beyond said container when said closure member has been released.

3. A blotting device for pen sets and the like comprising a container adapted to house a blotting strip, a releasable closure member therefor and resilient means for projecting a portion of said blotting strip beyond said container when said closure member has been released.

4. A blotting attachment for pens comprising a container adapted to house a blotting strip, means for permitting movement of the blotting strip only out of the container, a releasable closure member for said container and resilient means for projecting a portion of said blotting strip beyond said container for blotting purposes when said closure member has been released.

5. A blotting attachment for pens, comprising a container adapted to contain a blotting strip, means for permitting movement of the blotting strip only out of the container, a foldable bridge member having in unfolded position a length substantially greater than any cross sectional length of the attachment and in such position supporting the blotting strip for blotting purposes and a closure member for holding said bridge member in folded position when the attachment is not in use.

6. A blotting attachment for pens, comprising a container adapted to contain a blotting strip, means for permitting movement of the blotting strip only out of the container, a foldable resilient bridge member having in unfolded released position a length substantially greater than any cross sectional length of the attachment and in such position supporting the blotting strip for blotting purposes, and a closure member for holding said bridge member in folded compressed position when the attachment is not in use.

7. A blotting attachment for pens, comprising a container adapted to contain a blotting strip, means for permitting movement of the blotting strip only out of the container, a foldable bridge member having in unfolded position a length substantially greater than any cross sectional length of the attachment and in such position supporting the blotting strip for blotting purposes, at least one door for, when closed, holding said bridge member in folded position, and means for maintaining said door closed when the attachment is not in use.

8. A blotting attachment for pens, comprising a container adapted to contain a blotting strip, at least one door, means on said door for permitting movement of the blotting strip only out of the container, a foldable resilient bridge member constantly urging said door to open position, said member having in unfolded position, with the door open, a length substantially greater than any cross sectional length of the attachment and in such position supporting the blotting strip for blotting purposes, and means for maintaining the door closed and the bridge member in folded compressed position when the attachment is not in use.

9. A blotting attachment for pens comprising a container adapted to contain a blotting strip, a pair of doors, means on one of said doors for permitting movement of the blotting strip only out of the container, a foldable resilient bridge member connected to said doors and constantly urging them to open position, said member having in unfolded position, with the doors open, a length substantially greater than any cross sectional length of the attachment and in such position supporting the blotting strip for blotting purposes, and means for maintaining the door closed and the bridge member in folded compressed position when the attachment is not in use.

10. A blotting attachment for pens comprising a container adapted to contain a blotting strip, a pair of doors having passages therein for the blotting strip, means on one of said doors for permitting movement of the blotting strip only out of the container, a foldable resilient bridge member connected to said doors and constantly urging them to open position, said member having in unfolded position, with the doors open, a length substantially greater than any cross sectional length of the attachment and in such position supporting the blotting strip for blotting purposes, and means for maintaining the door closed and the bridge member in folded compressed position when the attachment is not in use.

11. A blotting attachment for pens comprising a container adapted to contain a blotting strip, a pair of doors having passages therein for the blotting strip, means on one of said doors for permitting movement of the blotting strip only out of the container, a foldable resilient bridge member connected to said doors and constantly urging them to open position, said member having in unfolded position, with the doors open, a length substantially greater than any cross sectional length of the attachment and in such position supporting the blotting strip for blotting purposes, and means for maintaining one door closed while the other is open and for permitting both doors to open simultaneously.

12. A blotting attachment for pens, comprising a container adapted to contain a blotting strip, at least one door, means on said door for permitting movement of the blotting strip only out of the container, a foldable resilient bridge member constantly urging said door to open position, said member having in unfolded position, with the door open, a length substantially greater than any cross sectional length of the attachment and in such position assuming an outwardly convex form to support the blotting strip for blotting purposes, and means for maintaining the door closed and the bridge member in folded compressed position when the attachment is not in use.

13. A blotting attachment for pens comprising, at one end thereof, a container adapted to contain a blotting strip, at the other end thereof, a door, means on said door for permitting movement of the blotting strip only out of the container, a slider movable between the ends of the attachment, a foldable resilient bridge member having one end attached to said door and the other end to said slider and constantly urging said door to open position, said member having in unfolded position, with the door open, a length substantially greater than any cross sectional length of the attachment and in such position supporting the blotting strip for blotting purposes, and means for maintaining the door closed and the bridge member in folded compressed position when the attachment is not in use.

14. A blotting attachment for pens and the like comprising a container adapted to contain a blotting strip, a pair of doors having passages therein for the blotting strip, a bridge member designed to extend between said doors when opened to form a support for part of said blotting strip, a coil spring secured to and extending between said doors, said bridge member being mounted on said coil spring, said coil spring normally urging said doors to open position, said coil spring and bridge member being movable to a position within said container when said doors are moving to closed position, and means for locking said doors in closed position.

15. The device as claimed in claim 14 in which the bridge member is notched at each end to receive a portion of the coil spring when the bridge, coil spring and doors are in their folded position.

16. In a blotting attachment, a container adapted to contain a blotting strip, said container being closed with the exception of one end and having an hinged cover to fit over said end, said container being formed to provide an opening through which a blotting strip may pass, said container having a collar-like member projecting therefrom intermediate its ends, said collar-like member having means on each side thereof for connecting with a holder on one side and for receiving a casing on the other side, said casing being provided with at least one door, means in connection with said door for receiving the blotting strip, resilient means for normally urging said door outwardly to project a portion of said blotting strip beyond said casing when said closure member is released, and means in connection with said casing for locking said door in closed position.

17. A device as claimed in claim 16 in which the means on each side of the collar for connecting with the holder and the casing comprise screw threaded nipples, the threads of each nipple differing, whereby said nipples can only be connected with the part for which they are intended.

18. The device as claimed in claim 16 in which the cover for the container is curved to co-operate with the resilient member connected with said door.

19. An attachment for pens comprising a container adapted to house a blotting strip, releasable closure members for said container to which said blotting strip is attached, one of the said closure members being slotted substantially from one side to the other whereby said blotting strip may be slipped into it from one side, the other member being slotted to receive the end of the strip, and including means for firmly holding said strip, and resilient means connected with said doors for projecting a portion of said blotting strip beyond said container when said closure member has been released.

20. The device as claimed in claim 19, in which the securing means in one of said closure members includes a roller having a rough surface, said roller also functioning as a means to facilitate insertion of said blotting strip in said closure member.

ROBERT INNES.